Oct. 21, 1924.　　　　　　　　　　　　　　　　1,512,429
J. D. LOUDON
SERVICE HOIST
Filed May 31, 1922
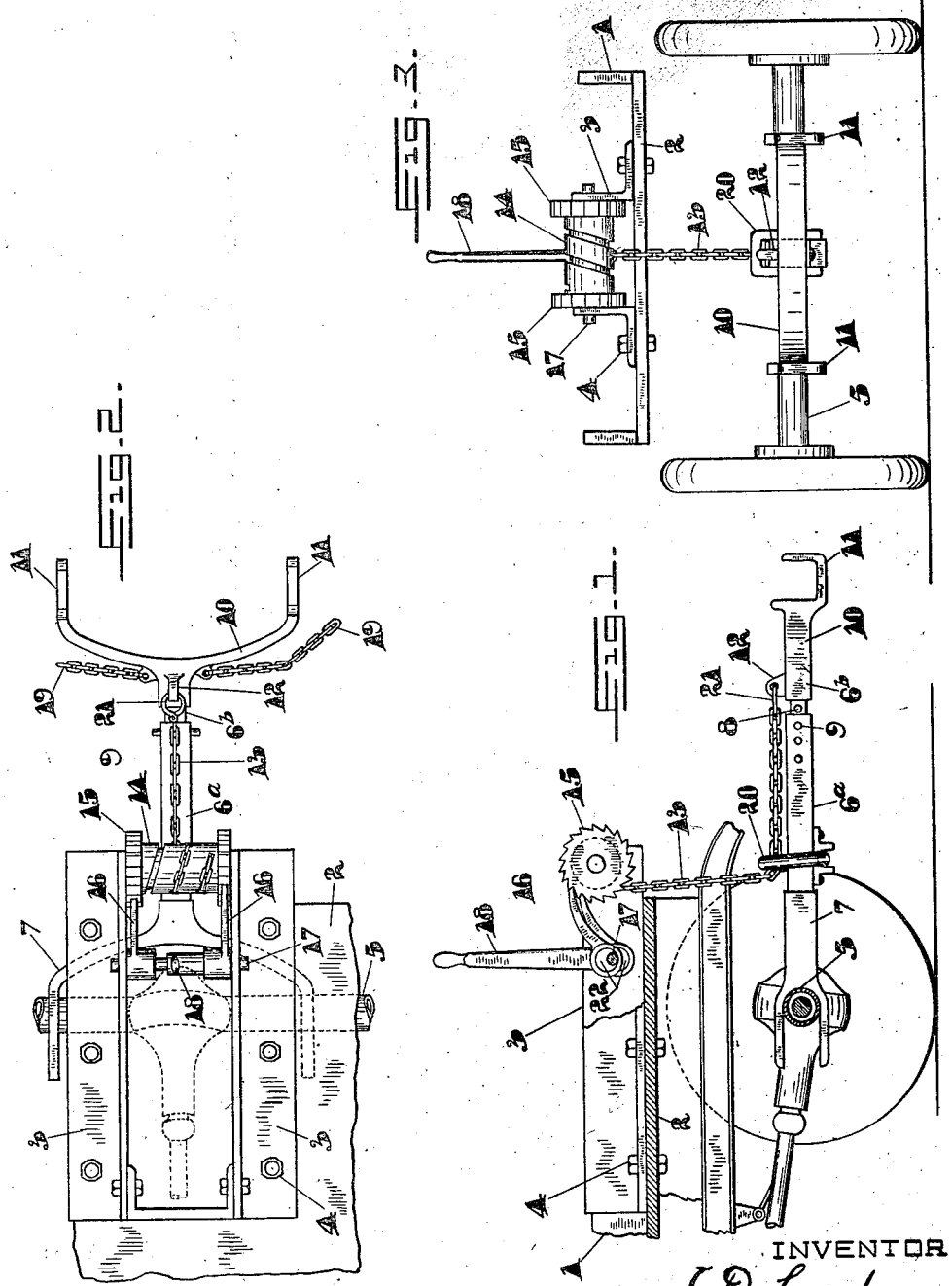
INVENTOR
J. D. Loudon,
BY J. Edward Maybee.
ATTY.

Patented Oct. 21, 1924.

1,512,429

UNITED STATES PATENT OFFICE.

JOHN D. LOUDON, OF SHELBOURNE, ONTARIO, CANADA.

SERVICE HOIST.

Application filed May 31, 1922. Serial No. 564,912.

*To all whom it may concern:*

Be it known that I, JOHN D. LOUDON, of Shelbourne, in the county of Dufferin, Province of Ontario, Canada, a subject of the King of Great Britain, have invented certain new and useful Improvements in Service Hoists, of which the following is a specification.

This invention relates to hoists and more particularly to that type mounted for use on a portable truck and my object is to devise apparatus for raising one end of a wrecked automobile from the ground and holding that end in its raised position while the wreck is being towed in for repair.

Further objects I have in mind will hereinafter appear.

I attain my objects by means of the constructions hereinafter described and illustrated in the accompanying drawings in which—

Fig. 1 is a side elevation of my device as applied to the rear end of a service car, the car being shown partly in section;

Fig. 2 a plan view of my device as applied to a service car; and

Fig. 3 a rear view of the same.

In the drawings like numerals of reference indicate corresponding parts in the different figures.

1 is the body of a service car of which 2 is the bottom. On the bottom are supported the two parallel angle bar members 3, which are held in spaced relationship to one another in any suitable manner. The forward ends of these angle bar members are held tightly against the bottom, preferably by means of hooks or bolts 4 passing through the bottom and secured to a suitable part of the chassis of the car.

5 is the rear axle of the service car, on which is adapted to be supported the member 6, which is provided with a forked end 7, one part passing on each side of the differential casing. Each part of the forked end 7 is itself forked, one part passing above and one part below the axle. It is evident that with this arrangement that the member 6 has a pivoted connection with the rear axle 5.

While the member 6, may be of fixed length, I prefer to make it of two parts 6ª and 6ᵇ, one part telescoping within the other, the inner part being provided with a series of holes 8 into any one of which a pin 9 may be inserted to hold the parts in any relationship to one another which may be desired.

The other end of the member 6 is also preferably provided with a forked end 10, and each part of the fork is provided with a hook 11, preferably of the shape shown in Fig. 2.

At the centre of the forked end 10 is formed a lug 12, to which is secured one end of a chain 13 by means of grab hooks 21, the other end of which chain is secured to a drum 14 journalled between the outer ends of the angle bar members 3. This drum is provided with a helical groove in which the chain is adapted to be wound. At each side of this drum is secured so as to revolve therewith the ratchet wheels 15, which ratchet wheels are operated by means of the pawls 16. On the pin 17 journalled in the members 3 are secured the eccentrics 22. The pawls are provided with eccentric straps for engagement with these eccentrics, the latter being arranged relative to one another so that one pawl is in engagement with its ratchet wheel while the other pawl is travelling back for a fresh stroke. Between the pawls 16, an operating lever 18 is secured to the pin 17 by means of which the pawls and ratchet wheels are operated and the chain 13 thus wound upon the drum 14.

To enable the member 6 to be raised by an upward pull on the chain 13 I provide a link 20 suitably connected with the member 6 and substantially in alinement with the drum 14. This link is adapted for the passage of the chain so that the pull on the member 6 is directed upwardly regardless of the position of the lug 12 relative to the drum. From this construction it follows that the chain 13 is so positioned that it will clear any obtruding part of a wrecked vehicle.

Chains 19 may be secured to each side of the forked end 10 which may be secured to the wreck being towed in to prevent the same sliding sideways in the hooks 11.

When the wreck is reached, the device is used by extending the member 6 to the desired length and lowering its outer end so that it may be caught under the end of the wreck to be lifted. The lever 18 is then operated to wind up the chain 13 on the drum 14 until the end of the wreck is lifted to the desired height, when the wreck is then towed in to the garage.

What I claim as my invention is:—

1. In a service hoist the combination of a service vehicle having a rear axle; a member having one end provided with a pivoted connection with the rear axle, the opposite end of the member being provided with a hook adapted to engage part of one end of a wrecked vehicle; a drum journalled on the service vehicle; a flexible connection having one end secured to the drum, the other end being provided with releasable means for connection with the member adjacent the hook; a link suitably carried by the member and substantially in vertical alinement with the drum and adapted for the passage of the flexible connection; and means for rotating the drum whereby the flexible connection will be wound thereon and the member lifted to raise the wrecked vehicle off the ground so that the wreck may be towed, the pivoted connection being adapted to permit the member to swing vertically and horizontally.

2. In a service hoist the combination of a service vehicle having a rear axle; a rigid member having one end forked, each end of the fork being provided with a pair of jaws adapted to be passed over the said rear axle, the opposite end of the member being also forked, each part of this fork being provided with a hook adapted to engage part of one end of a wrecked vehicle to raise the latter; and means carried by the service vehicle for lifting the rigid member whereby the end of the wrecked vehicle is lifted off the ground, the aforesaid jaws being adapted to permit the rigid member to swing vertically and horizontally.

Signed at Toronto, Can., this 19th day of May, 1922.

JOHN D. LOUDON.